(12) United States Patent
Bell

(10) Patent No.: US 11,470,840 B2
(45) Date of Patent: Oct. 18, 2022

(54) HUNTING BLIND

(71) Applicant: Anthony R. Bell, Arkadelphia, AR (US)

(72) Inventor: Anthony R. Bell, Arkadelphia, AR (US)

(*) Notice: Subject to any disclaimer, the term of this patent is extended or adjusted under 35 U.S.C. 154(b) by 120 days.

(21) Appl. No.: 16/935,345

(22) Filed: Jul. 22, 2020

(65) Prior Publication Data

US 2022/0022446 A1  Jan. 27, 2022

(51) Int. Cl.
*A01M 31/02* (2006.01)
*E04H 15/00* (2006.01)

(52) U.S. Cl.
CPC ......... *A01M 31/025* (2013.01); *E04H 15/001* (2013.01)

(58) Field of Classification Search
CPC ............................. E04H 15/001; A01M 31/025
See application file for complete search history.

(56) References Cited

U.S. PATENT DOCUMENTS

| | | | | |
|---|---|---|---|---|
| 2,780,471 A * | 2/1957 | Lempke | ............... | E04H 15/001 280/19.1 |
| 2,811,977 A | 11/1957 | McClish | | |
| 3,018,857 A * | 1/1962 | Parham | ............... | E04H 15/001 52/63 |
| 3,323,530 A * | 6/1967 | Smith | ............... | A01M 31/00 135/157 |
| 3,826,270 A * | 7/1974 | Hentges | ............... | E04H 15/001 280/19.1 |
| 4,106,145 A * | 8/1978 | Gillen | ............... | A01M 31/025 114/351 |
| 4,456,272 A | 6/1984 | Kroeger | | |
| 4,683,672 A * | 8/1987 | Davis | ............... | A01M 31/025 135/901 |
| 4,798,019 A * | 1/1989 | Sury | ............... | A01M 31/025 135/901 |
| 5,458,079 A * | 10/1995 | Matthews | ............... | B63B 17/02 114/351 |
| 5,622,198 A * | 4/1997 | Elsinger | ............... | E04H 15/48 135/128 |
| 5,653,456 A * | 8/1997 | Mough | ............... | B62B 15/009 280/19.1 |
| 5,906,217 A * | 5/1999 | Hill | ............... | E04H 15/48 135/124 |
| 6,397,870 B1 * | 6/2002 | Makedonsky | ............... | E04H 15/001 135/116 |

(Continued)

OTHER PUBLICATIONS

Honker Guide, Duck Blind, Aug. 29, 2007, https://www.refugeforums.com/threads/duck-blind.553565/.

(Continued)

*Primary Examiner* — David R Dunn
*Assistant Examiner* — Danielle Jackson
(74) *Attorney, Agent, or Firm* — Burr & Forman, LLP; Hunter S. Freeman

(57) ABSTRACT

The invention relates to a hunting blind having a front blind and a rear blind where the front blind may be placed in a collapsed or erect position and when in an erect position, the front blind is laterally spaced from the rear blind and the front blind has a height that is less than the height of the rear blind. The invention may also include a side shooting widow that is defined in the side of the rear blind and may also include a foot rest.

20 Claims, 7 Drawing Sheets

(56) References Cited

U.S. PATENT DOCUMENTS

| | | | |
|---|---|---|---|
| 6,505,707 B1* | 1/2003 | Berry | A01M 31/025 |
| | | | 182/116 |
| 6,510,922 B1 | 1/2003 | Hodnett | |
| 10,034,473 B1* | 7/2018 | Ellsworth | H02S 99/00 |
| 10,584,511 B1* | 3/2020 | Slaughter | E04B 1/344 |
| 2003/0046855 A1* | 3/2003 | Bergdall | A01M 31/025 |
| | | | 43/1 |
| 2005/0183758 A1 | 8/2005 | Corbitt | |
| 2008/0066794 A1* | 3/2008 | Durfee | E04H 15/001 |
| | | | 135/96 |
| 2013/0036681 A1* | 2/2013 | Baird, III | A01M 31/025 |
| | | | 52/143 |
| 2016/0128318 A1 | 5/2016 | Birch | |

OTHER PUBLICATIONS

Pond King, Inc., Pond King Champ With Duck Blind, https://pondking.com/products/pond-king-champ-with-duck-blind.

Scheels, Alps Outdoors Zero-Gravity Layout Blind, https://www.scheels.com/p/alps-outdoorz-zero-gravity-layout-blind/70343892438.html.

* cited by examiner

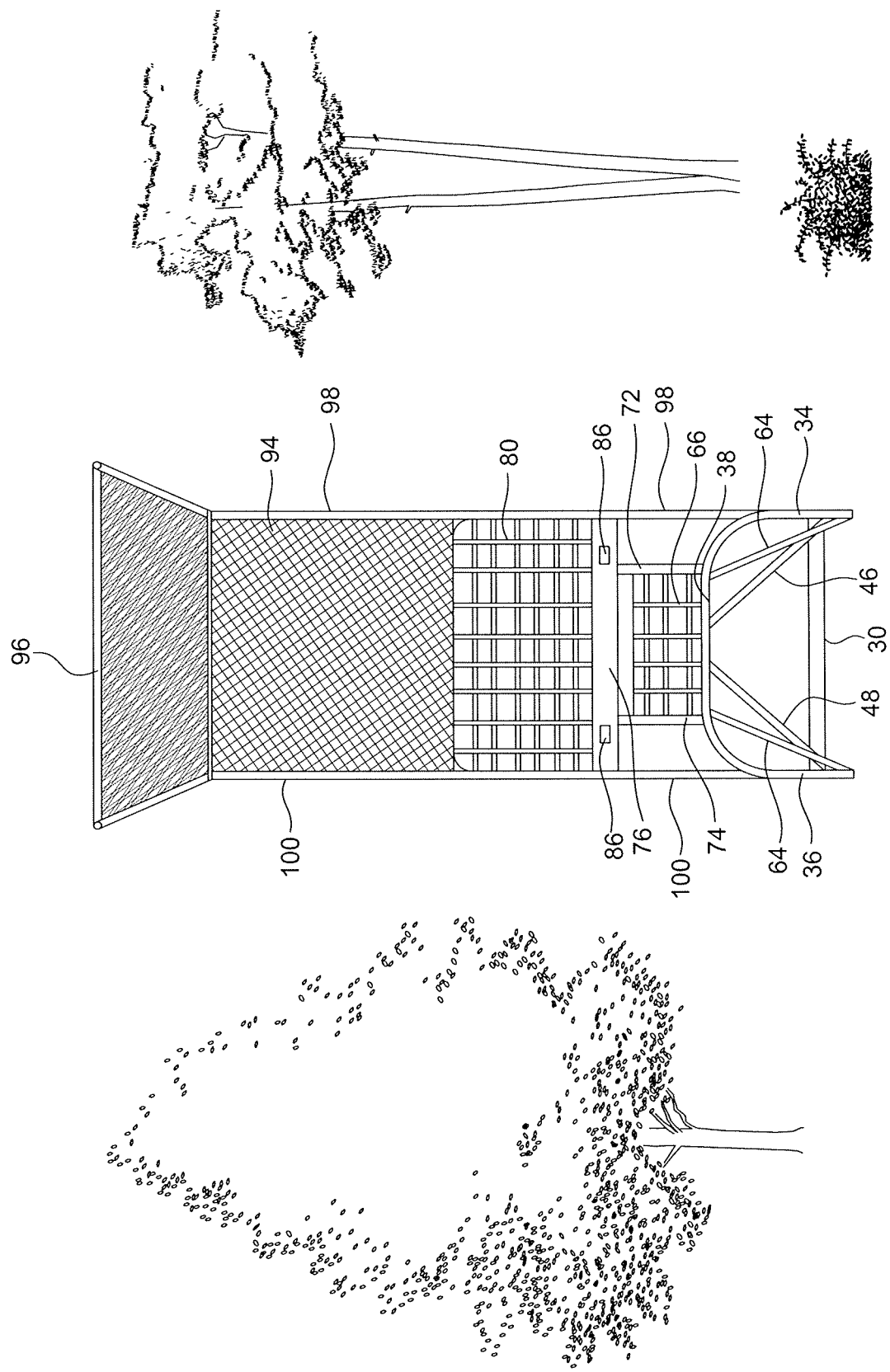

HUNTING BLIND

BACKGROUND OF THE INVENTION

1) Field of the Invention

The present invention relates to an improved, portable hunting blind.

2) Description of Related Art

Hunting blinds of the prior art tend to be bulky, cumbersome to move and are often times meant to be installed up in a tree. This can be disadvantageous for older hunters or hunters who lack the necessary strength or mobility to move a large blind or to install it in a tree or to even up the tree in the first place.

Hunters using hunting blinds are often in the blinds for quite some time and often times need to stay very still and quiet so as not to spook the animals being hunted. Unfortunately, many of the hunting blinds of the prior art are often times uncomfortable, which makes spending large amounts of time in the blind more difficult and less desirable.

Other hunting blinds require hunters to stick a portion of their upper body out of the blind in order to obtain an unobstructed shot at the animal being hunted. As such, these prior art hunting blinds force the hunter to expose him or herself, which could increase the chance of spooking the animals being hunted.

Accordingly, it is an object of the present invention to provide a portable hunting blind that can be towed behind a vehicle or maneuvered by hand.

It is another object of the present invention to provide a hunting blind that is comfortable.

It is another object of the present invention to provide a hunting blind that multiple shooting windows through which the hunter may shoot a gun without being obstructed by the hunting blind.

SUMMARY OF THE INVENTION

The above objectives are accomplished according to the present invention by providing A hunting blind comprising: a base that includes a first skid and a second skid, wherein said first and said second skid are generally parallel to one another; a first support member that is disposed at a front portion of said base and extends generally upwards from said base; a second support member that is disposed at a rear portion of said base and extends generally upwards from said base; a first rear side wall and a second rear side wall, each of which is carried by said rear portion of said base so that said first and said second rear side walls extend generally upwards from said base; a back wall interconnecting said first and said second side walls; a top wall that is carried by one of said back wall, said first rear side wall and said second rear side wall wherein said top wall, said back wall, said first rear side wall and said second rear side wall create a rear blind having an interior space; a seat that is carried by said second vertical support, wherein at least a portion of said seat is disposed within said interior space of said rear blind; a front wall that is pivotally carried by said first support member; a first front side wall and a second front side wall that oppose one another and that extend from said front wall in a direction that is generally perpendicular to said front wall, wherein said front wall, said first front side wall and said second side wall create a front blind having a collapsed position as well as an erect position where said front wall is placed in an angled position with respect to a vertical axis wherein the angle between said front wall and the vertical axis is between 0 and 45 degrees; and, whereby when said front blind is in said erect position, said first and second front side walls of said front blind are laterally spaced from said first and second rear side walls of said rear blind to create an entryway into said hunting blind and when said front blind is in said erect position, said front blind extends to a height that is less than a height of said rear blind to create an opening through which to shoot a gun.

In one embodiment, when said front blind is in said erect position, said front wall of said front blind has a height that is equal to the height of said side shooting window.

In one embodiment, the first support member is the same height as the second support member and each of said first support and said second support member are carried by said first skid and said second skid and are interconnected by a horizontal cross bar.

In another embodiment, said top wall of said rear blind is carried by said back wall and one of said first rear side wall and said second rear side wall.

In another embodiment, said front blind is in said erect position, said front wall of said front blind is angled towards said rear blind.

In another embodiment the hunting blind further comprises a platform that is carried by said first support member so that said platform is generally parallel to said base and is disposed beneath said front blind and at a height from said base that is equal to a height at which a base portion of said seat is carried by said second vertical support.

BRIEF DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein:

FIG. 7 shows a front elevation view of an embodiment of the present invention.

Figure 1:
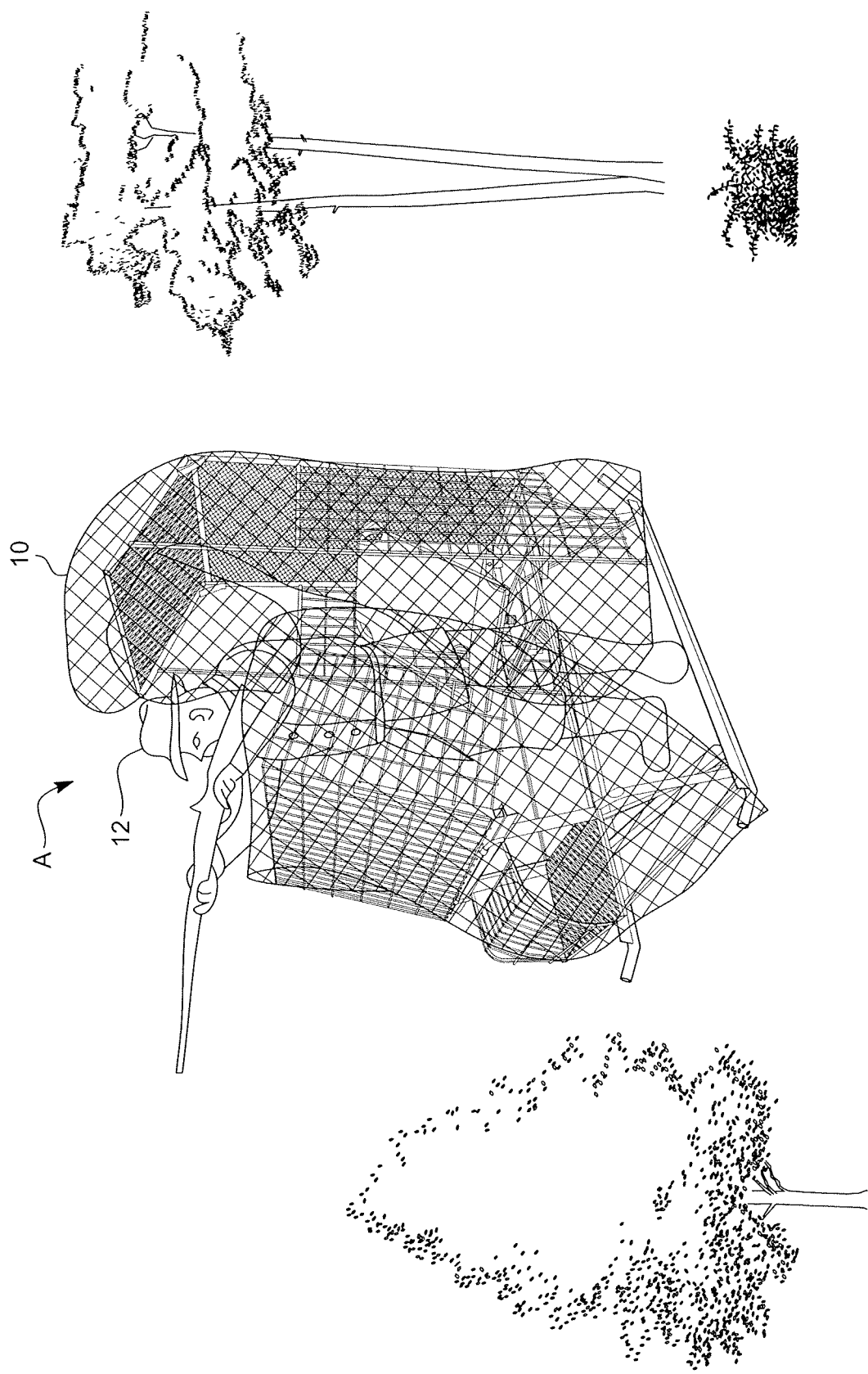
FIG. 1 shows a perspective view of an embodiment of the present invention while in use.

It will be understood by those skilled in the art that one or more aspects of this invention can meet certain objectives, while one or more other aspects can meet certain other objectives. Each objective may not apply equally, in all its respects, to every aspect of this invention. As such, the preceding objects can be viewed in the alternative with respect to any one aspect of this invention. These and other objects and features of the invention will become more fully apparent when the following detailed description is read in conjunction with the accompanying figures and examples. However, it is to be understood that both the foregoing summary of the invention and the following detailed description are of a preferred embodiment and not restrictive of the invention or other alternate embodiments of the invention. In particular, while the invention is described herein with reference to a number of specific embodiments, it will be appreciated that the description is illustrative of the invention and is not constructed as limiting of the invention. Various modifications and applications may occur to those who are skilled in the art, without departing from the spirit and the scope of the invention, as described by the appended claims. Likewise, other objects, features, benefits and advantages of the present invention will be apparent from this summary and certain embodiments described below, and will be readily apparent to those skilled in the art. Such objects, features, benefits and advantages will be apparent from the above in conjunction with the accompanying examples, data, figures and all reasonable inferences to be drawn therefrom, alone or with consideration of the references incorporated herein.

DETAILED DESCRIPTION OF A PREFERRED EMBODIMENT

With reference to the drawings, the invention will now be described in more detail. Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are herein described.

Unless specifically stated, terms and phrases used in this document, and variations thereof, unless otherwise expressly stated, should be construed as open ended as opposed to limiting. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

Referring now to FIG. 1, the present invention generally relates to a hunting blind, which is sometimes referred to simply as a blind. An embodiment of the present invention can be seen generally as (A). In this figure, the invention is shown while in use, such that camouflage 10 is draped over and/or around the invention and a hunter 12 appears inside of the blind.

Referring now to FIGS. 2-7, the structural elements of various embodiments of the present invention can be more clearly seen. An embodiment of the invention includes a front blind 14, a rear blind 16, a base 18 and a foot rest 20. In at least one embodiment, the base includes a first skid 22 and a second skid 24, which may be generally parallel to one another. In at least one embodiment, the skids 22 & 24 have a bottom surface that is flat so that the skids are generally shaped like and act like skies that can more easily slide across the ground. In alternate embodiments, the skids may have a shape that is generally cylindrical or any other shapes that are generally known. In at least one embodiment, the skids may include a flanged tail section 26 that extends upwardly from the skid at an obtuse angle $\Theta 1$. In at least one embodiment, the skids may also include a flanged front section 28 that also extends upwardly from the skid at an obtuse angle $\Theta 2$. In the shown embodiment, the first and second skids 22 & 24 are interconnected by at least one horizontal cross bar 30, which also has a bottom surface that may be generally flat or cylindrical.

In the shown embodiment, the invention further includes a front support member 32 and a rear support member 34. The front support member is disposed at the front of the skids and in embodiments where the skids have a flanged front section 28, the front support member 32 is disposed adjacent to the flanged front section 28. Similarly, the rear support member 34 is disposed at the rear of the skids such that the rear support member 34 is adjacent to the flanged tail section 26.

Figure 6:
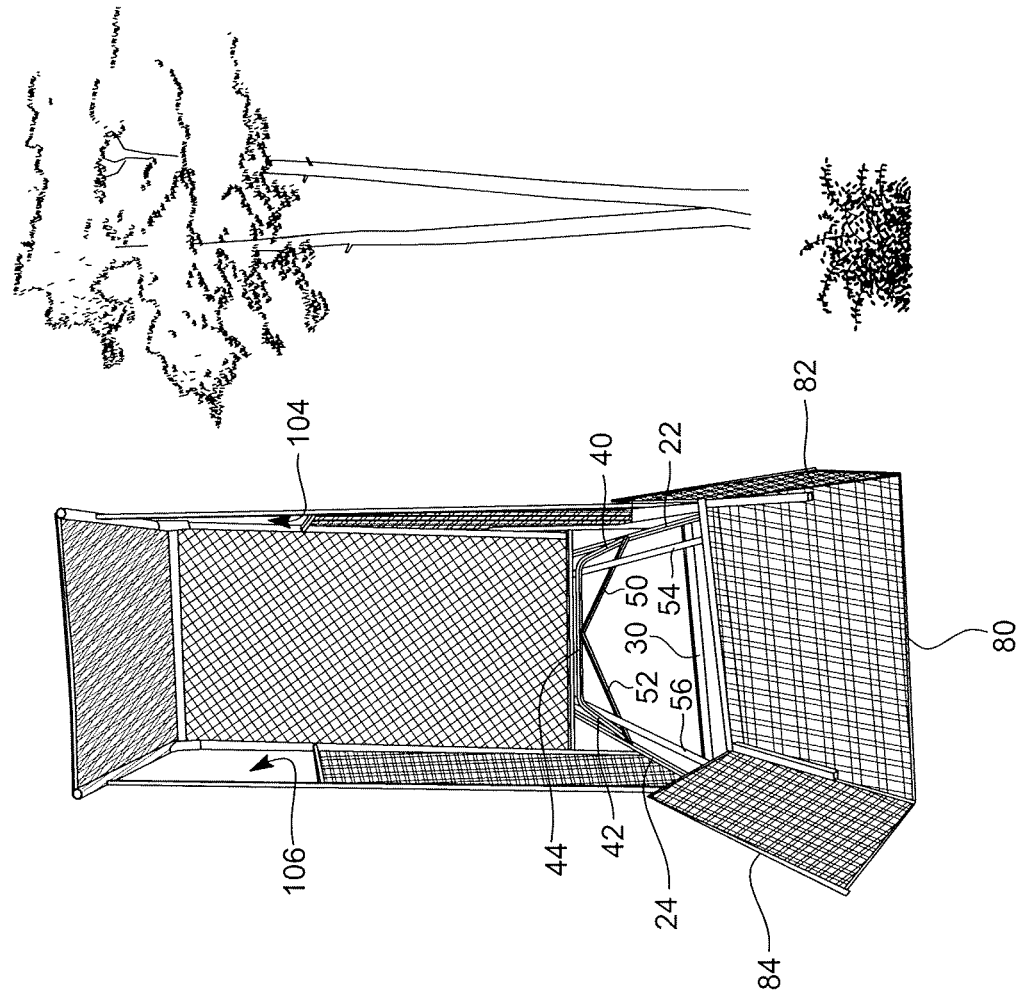
FIG. 6 shows a front elevation view of an embodiment of the present invention.

As shown in FIG. 7, in at least one embodiment, the front support members includes a first vertical leg 34 that is carried by the first skid 22 and a second vertical leg 36 that is carried by the second skid 24 so that it opposes the first vertical leg 34. The first support member 32 further includes a horizontal leg 38 that interconnects the first and second vertical legs 34 and 36. As shown in FIG. 6, the rear support member 34 similarly comprises a first vertical leg 40 that is carried by the first skid 22, an opposing second vertical leg 42 that is carried by the second skid 24 and a horizontal leg 44 that interconnects the two opposing vertical legs 40 and 42.

In at least one embodiment, the front support member 32 includes a first angled support leg 46 and a second angled support leg 48. In this embodiment both of the angled support legs extend from the horizontal leg 38 to either (a) one of the vertical legs 34 and 36 or (b) one of the skids 22 and 24. These angled legs 46 & 48 provide additional support to the horizontal leg 38 so in at least one embodiment, the angled legs extend from a point that is adjacent to the midpoint of the horizontal leg 38 such that a first end of the angled legs is carried by the horizontal leg 38 and a second, opposite end of the angled legs is carried by one of the vertical legs 34 and 36 or one of the skids 22 and 24. Similarly, the rear support member 34 includes a first and a second angled leg 50 and 52. In at least one embodiment, these angled legs 50 and 52 are carried by the second support member's horizontal leg 44 and either (a) one of the vertical legs 40 and 42 or (b) one of the skids 22 and 24 in much the same manner as the angled legs 46 and 48 of the front support member 32.

Figure 5:
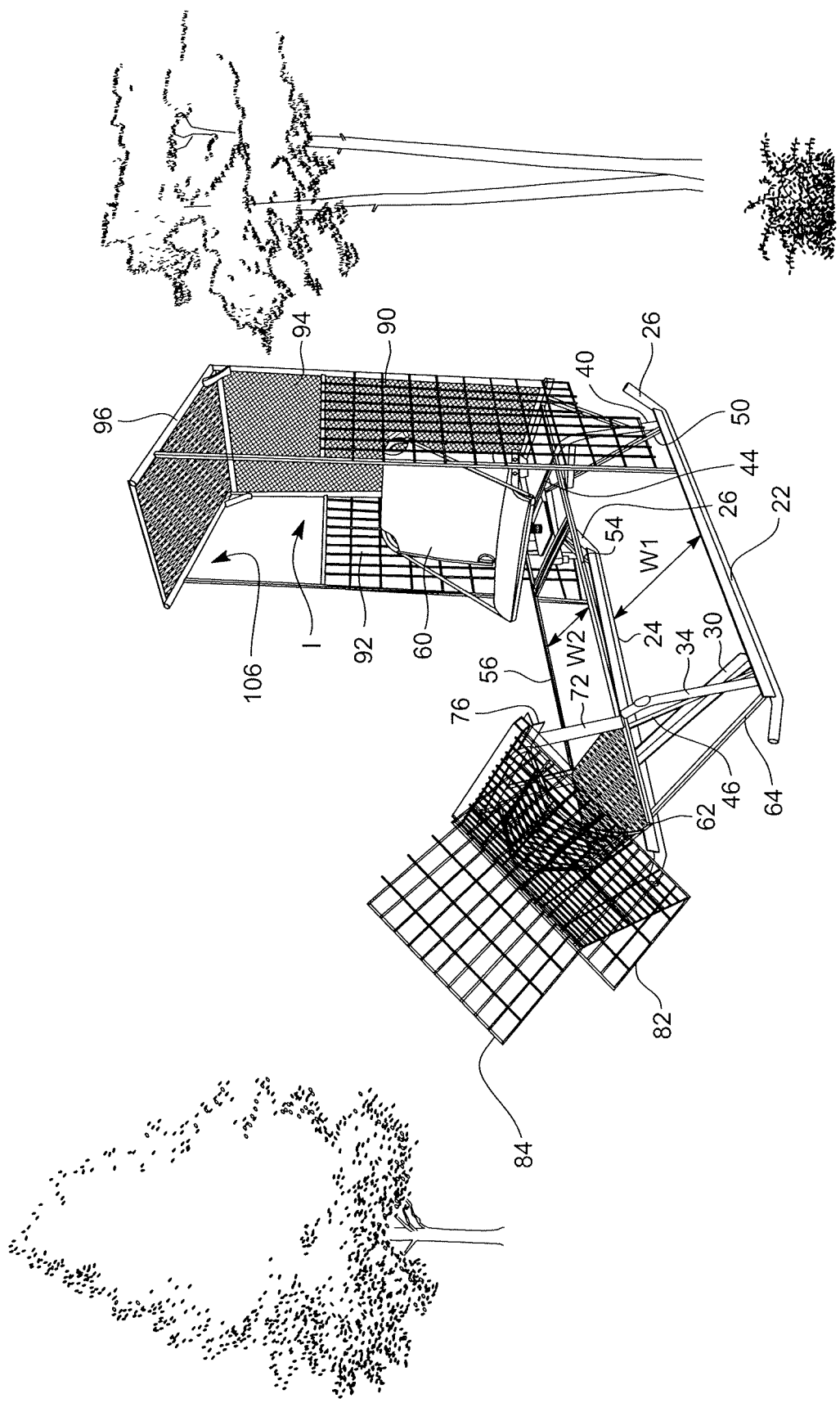
FIG. 5 shows a perspective view of an embodiment of the present invention.

As can be seen in FIG. 5, in at least one embodiment, the first support member 32 and the second support member 34 have the same height and are interconnected by two support member cross bars 54 and 56. In this embodiment, the support member cross bars are in a generally parallel position to the skids 22 and 24. In at least one embodiment, the support member cross bars 54 & 56 are positioned closer to one another than the skids 22 and 24 so that the support member cross bars are both located within the width W1 of the skids and the width W2 between the support member cross bars 54 and 56 is less than the width W1 between the skids 22 and 24. In alternate embodiments, the support member cross bars 54 and 56 can be located directly over the skids such that the width W2 between them is equal to the width W1 between the skids 22 and 24.

In one embodiment, rear support member 34 pivotally carries a seat 60 while the front support member 32 carries a horizontal platform 62 that may serve as a foot rest or a storage compartment. The horizontal platform 62 extends outwardly from the horizontal leg 38 in a manner that is generally parallel to the skids 22 and 24 and generally perpendicular to the vertical legs 34 and 36. In at least one embodiment, the invention includes a platform support member 64 that extends between the horizontal platform 62 (and preferably a front section of the horizontal platform) and either (a) one or both of the vertical legs 34 and 36; and (b) one or both of the skids 22 and 24. In at least one embodiment, the invention further includes a mesh-like wall 66 that extends upwardly from the outermost, front edge of the horizontal platform 62. The mesh-like wall 66 may be radiused so that it curves back towards the first front support member 32.

In at least one embodiment, the first front support member 32 carries a second front support member 70. Much like the first front support member 32, the second front support member 70 includes two vertical legs 72 and 74 that are interconnected by a horizontal leg 76. In at least one embodiment, the mesh-like wall 66 interconnects the horizontal platform 66 and the horizontal leg 76 of the second front vertical support. In at least one embodiment, the width between the vertical legs 72 and 74 of the second front support member 70 is less than the width of the vertical legs 36 and 34 of the first front support member such that the second support member's vertical legs 72 and 74 are located within the width of the first front support member's vertical legs 34 and 36.

In another embodiment, the horizontal leg 76 of the second support member 70 pivotally carries the front blind 14. The front blind comprises a front wall 80 and two opposing side walls 82 and 84 which are interconnected by the front wall and extend perpendicularly from the front wall. In at least one embodiment, the front blind 14 has an erect position, which is shown generally as Position (E) in FIG. 2 and a collapsed position, which is shown generally as Position (C) in FIG. 3. Because the bottom of the front wall 80 is pivotally connected to the horizontal leg 76 of the second front support member 70, via at least one hinge 86, the front blind 14 may be rotated from the collapsed position to the erect position. The front blind 14 can be transitioned from the collapsed position into the erect position by rotating the front wall 80 towards the rear blind 16 and/or in an upward direction. Conversely, the front blind 14 can be transitioned from the erect position into the collapsed position by rotating the front wall 80 away from the rear blind 16 and/or in an downward direction towards the horizontal platform 66 or towards the front flanged section 28 of the skids 22 and 24.

In at least one embodiment, when in the erect position, the front blind's front wall 80 is generally parallel to the vertical legs 32, 34, 72 and 74 of the first and second front support members 32 and 70 and generally perpendicular to the two skids 22 and 24. In alternate embodiments, when in the erect position, the front wall 80 is placed in an angled position with respect the vertical legs 72, 74, 34 and 36 of the two front support members 70 and 32 such that the angle Θ3 between the front wall 80 and the vertical axis V along which vertical legs 34 and 36 of the front support member 32 extend is between 0 and 45 degrees. In at least one embodiment, the angle Θ3 is approximately 20 degrees.

In the shown embodiment, the rear blind 16 includes a first rear side wall 90 and a second rear sidewall 92 that opposes the first rear side wall. The rear blind further includes a back wall 94 that interconnects the first and second rear side walls 90 and 92 and also includes a top wall 96 that is carried by any one of (or all of) the first and second side walls and the back wall. The first and second rear side walls, back wall and the top wall create an interior space, which is shown as (I) in FIG. 5 in which at least a portion of the seat 60 is located.

In at least one embodiment, each of the rear side walls includes a support rod 98 and 100 that extends from the skids 22 and 24 in a upward direction that is generally perpendicular to said skids 22 and 24. In the embodiment shown in FIGS. 3-4, at least a portion 102 of the rear side walls extends upwardly from the skids 22 and 24. In the embodiment shown in FIGS. 2 and 5, the rear side walls 90 and 92 are vertically spaced from the skids 22 and 24.

In at least one embodiment, the invention includes a pair of side shooting windows 104 and 106 that are defined by the rear side walls 90 and 92 and the top wall 96. These side shooting windows provide the user with an unobstructed view from inside of the rear blind's interior space so that the user can shoot a gun through either or both of the side shooting windows while seated in the seat 60. In one embodiment, the side shooting windows are defined by the rear side walls 90 and 92, the support rods 9 and 100, the top wall 96 and the back wall 94. In this embodiment, each of the shooting widows has a bottom that is defined by the side walls 90 and 92 and a top that is defined by the top wall 96. In alternate embodiments, however, the side shooting windows could be disposed completely within and defined by the rear side walls 90 and 92. In this embodiment both the top and bottom of the shooting windows 104 and 106 is defined by the side walls 90 and 92, respectively.

Figure 2:
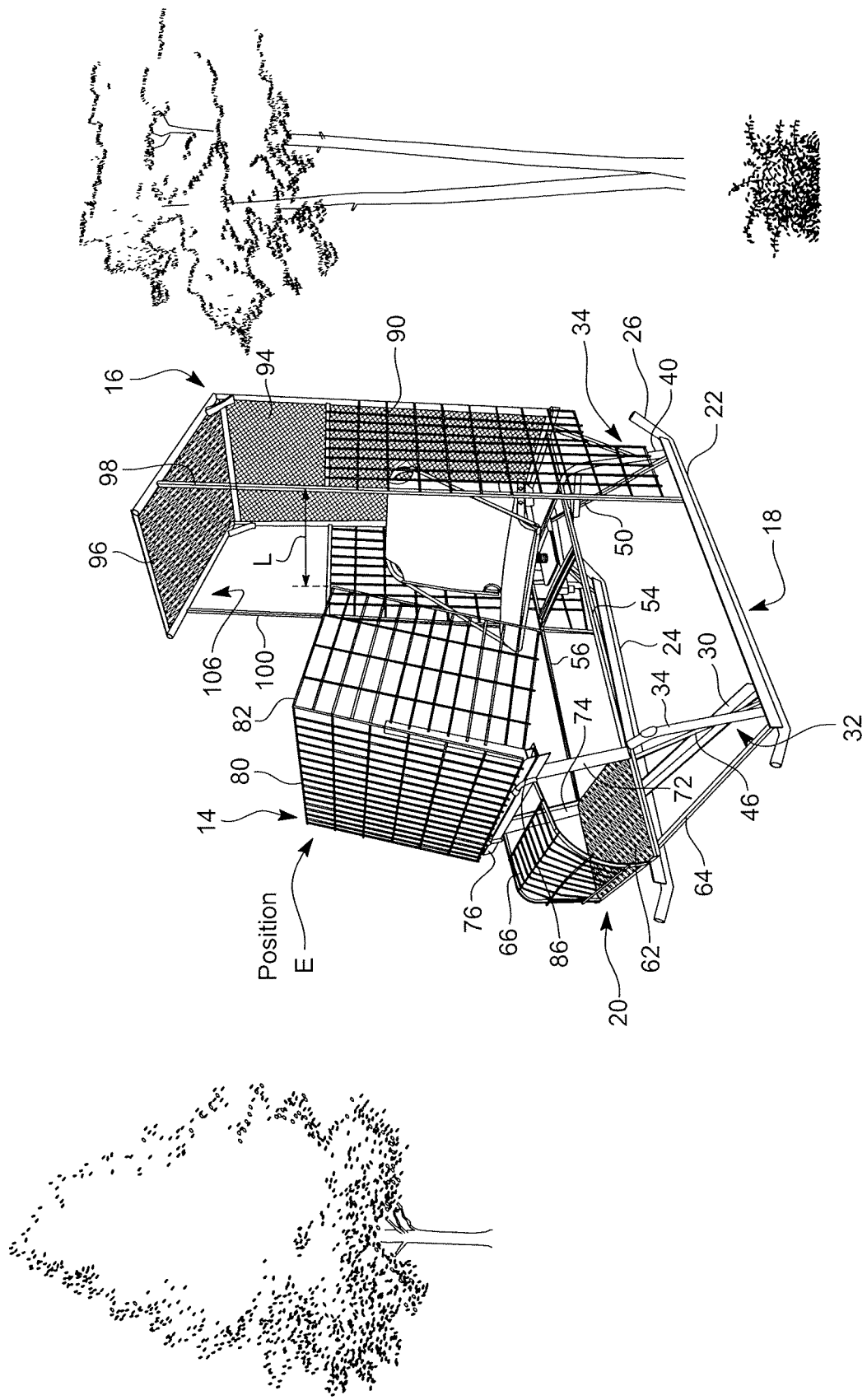
FIG. 2 shows a perspective view of an embodiment of the present invention.
Figure 3:
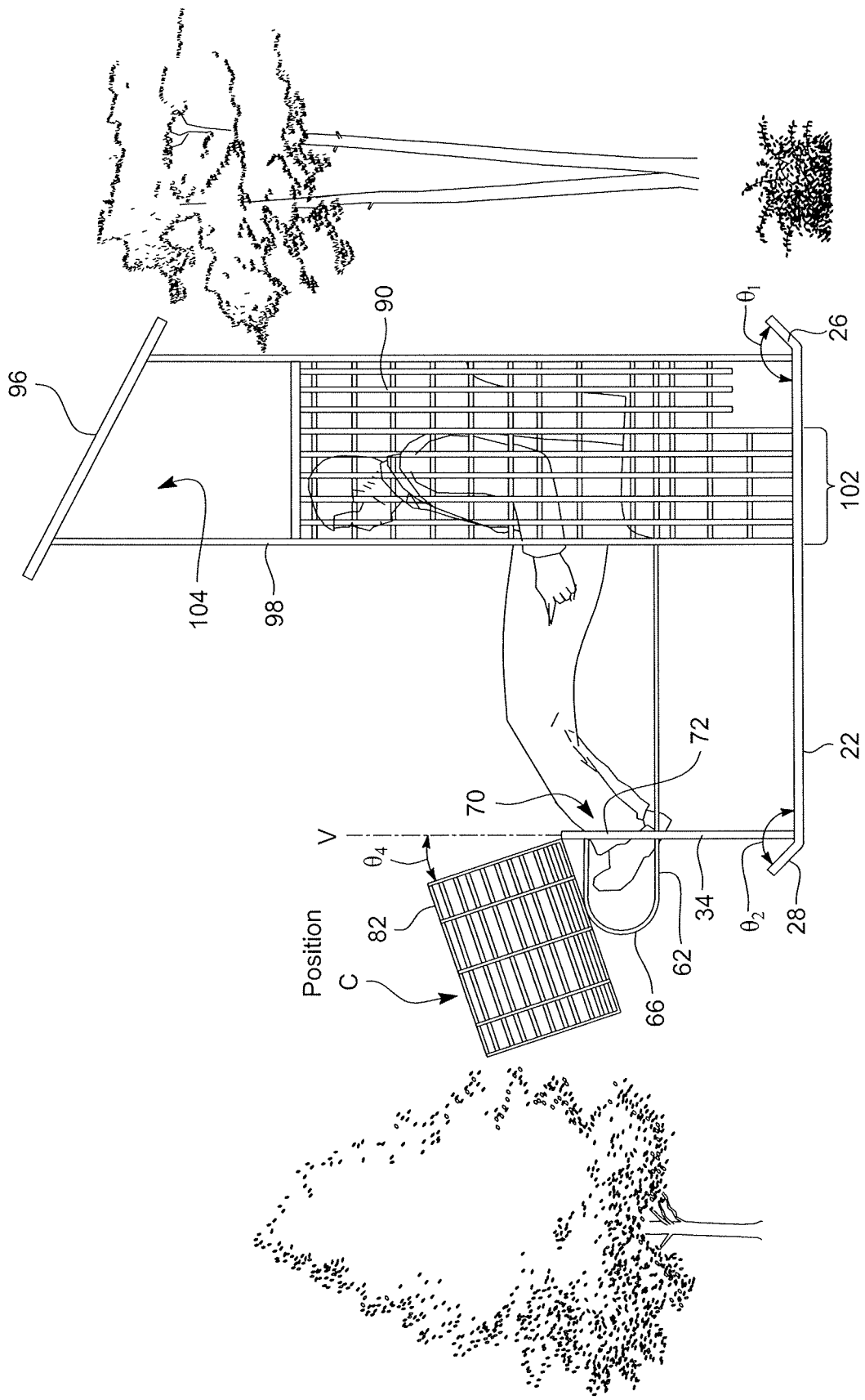
FIG. 3 shows a side elevation view of an embodiment of the present invention.
Figure 4:
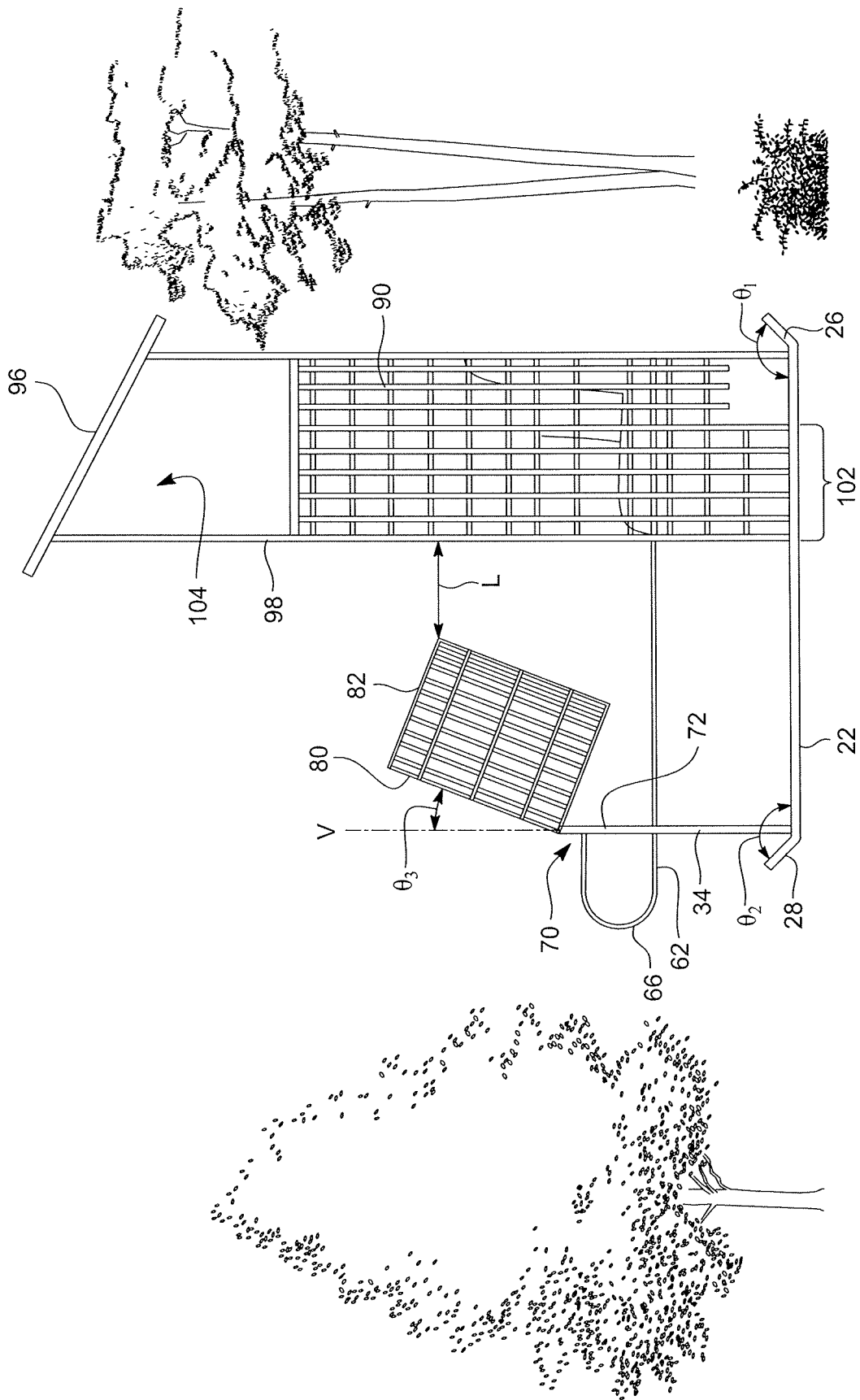
FIG. 4 shows a side elevation view of an embodiment of the present invention.

In at least one embodiment, the rear blind 16 and the front blind 14 are laterally spaced from one another such that when the front blind is in the erect position (E), the first and second front side walls 82 and 84 are laterally spaced from the first and second rear side walls 90 and 92 by distance (L) as shown in FIGS. 2 & 4. This lateral spacing creates and entry and exit point through which the user may enter the blind. Lateral spacing (L) also allows the user to shoot a gun through this opening.

In one embodiment, the rear blind 16 and the front blind 14 have different heights such that when in the erect position (E), the front blind 14 has a height (as measured from the top of front wall 80 to the base 18) that is lower than the height of rear blind (as measured from the top wall 96 to the base 18). This height differential provides a front shooting gallery so the user may shoot a gun over the front blind 14 while seated in the seat 60. In at least one embodiment, when in the erect position (E), the front blind 14 has a height that is approximately equal to the height of the bottom of at least one of the side shooting windows 94 and 96 (as measured from the bottom of the shooting window to the base 18). Such an arrangement provides the user with a 180 shooting gallery that comprises the front shooting gallery over the front blind 14 and the two side shooting windows 94 and 96.

In use, the user may pull the hunting blind behind a vehicle such as an ATV. The inclusion, placement and design of the skids 22 and 24 makes it relatively easy for the invention to slide over the ground, even when the terrain is rough. Once in place, the user may drape camouflage over both the front blind 14 and/or the rear blind 16 so as to keep both the blind and the user within the blind relatively hidden. The user may then enter the blind by either placing the front blind in the collapsed position (C) or by entering through the lateral space (L). Once inside, the user may sit in the seat 60 and prop his/her feet up on the horizontal platform 66. The user may also shoot a gun through the front shooting gallery created by the height differential between the front blind 14 and the rear blind 16, through the lateral space (L) or through either of the side shooting windows 94 and 96.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. A hunting blind comprising:
   a base that includes a first skid and a second skid, wherein said first and said second skid are generally parallel to one another;
   a first support member that is disposed at a front portion of said base and extends generally upwards from said base;
   a second support member that is disposed at a rear portion of said base and extends generally upwards from said base;
   a first rear side wall and a second rear side wall, each of which is carried by said rear portion of said base so that said first and said second rear side walls extend generally upwards from said base;
   a back wall interconnecting said first and said second side walls;
   a top wall that is carried by one of said back wall, said first rear side wall and said second rear side wall wherein said top wall, said back wall, said first rear side wall and said second rear side wall create a rear blind having an interior space;
   a seat that is carried by said second vertical support, wherein at least a portion of said seat is disposed within said interior space of said rear blind;
   a front wall that is pivotally carried by said first support member;
   a first front side wall and a second front side wall that oppose one another and that extend from said front wall in a direction that is generally perpendicular to said front wall, wherein said front wall, said first front side wall and said second side wall create a front blind having a collapsed position as well as an erect position wherein when said front blind is in said collapsed position, said front wall is placed in an angled position with respect to a horizontal axis, so that said front wall extends downwardly from said horizontal axis toward said base and when said front blind is in said erect position, said front wall is placed in an angled position with respect to a vertical axis wherein the angle between said front wall and the vertical axis is between 0 and 45 degrees; and,
   whereby when said front blind is in said erect position, said first and second front side walls of said front blind are laterally spaced from said first and second rear side walls of said rear blind to create an entryway into said hunting blind and when said front blind is in said erect position, said front blind extends to a height that is less than a height of said rear blind to create an opening through which to shoot a gun.

2. The hunting blind of claim 1 wherein said first support member is the same height as the second support member and each of said first support member and said second support member are carried by said first skid and said second skid.

3. The hunting blind of claim 1 further comprising a horizontal cross bar interconnecting said first support member and said second vertical support.

4. The hunting blind of claim 1 wherein said top wall of said rear blind is carried by said back wall and one of said first rear side wall and said second rear side wall.

5. The hunting blind of claim 1 wherein when said front blind is in said erect position, said front wall of said front blind is angled towards said rear blind.

6. The hunting blind of claim 1 further including a platform that is carried by said first support member so that said platform is generally parallel to said base and is disposed beneath said front blind.

7. The hunting blind of claim 6 wherein said platform is disposed a height from said base that is equal to a height at which a base portion of said seat is carried by said second vertical support.

8. A hunting blind comprising:
   a base that includes a front portion, and a rear portion;
   a rear blind comprising a first rear side wall, a second rear side wall and a back wall, wherein each of said first and said second rear side wall is carried by said rear portion of said base and said back wall interconnects said first and said second rear side walls;
   a seat that is carried by said base, wherein at least a portion of said seat is disposed within an interior space created by said first rear side wall, said second rear side wall and said back wall of said rear blind;
   a front blind comprising a first front side wall, a second front side wall and a front wall that is generally rigid and interconnects said first front side wall and said second front side wall, wherein said front blind is pivotally carried by said base so that said front blind may be placed in a collapsed position by rotating said front blind in a first direction and an erect position by rotating said front blind in a second direction that is generally opposite said first direction; and,
   whereby when said front blind is in said erect position, said first and second front side walls of said front blind are laterally spaced from said first and second rear side walls of said rear blind to create an entryway into said hunting blind and when said front blind is in said erect position, said front blind extends to a height that is less than a height of said rear blind to create an opening through which to shoot a gun.

9. The hunting blind of claim 8 further including a top wall that is carried by one of said back wall, said first rear side wall and said second rear side wall of said rear blind.

10. The hunting blind of claim 8 wherein said rear blind further comprises a side shooting window that is defined by said top wall and one of said first rear side wall and said second rear side wall of said rear blind.

11. The hunting blind of claim 10 wherein when said front blind is in said erect position, said front blind has a height that is equal to the height of said side shooting window.

12. The hunting blind of claim 8 wherein said top wall of said rear blind is carried by each of said rear wall, said first rear side wall and said second rear side wall of said rear blind so that said top wall is disposed in an angled relation to said rear wall, said first rear side wall and said second rear side wall so that a side of said top wall that is carried by said back wall is lower than an opposing side of said top wall.

13. The hunting blind of claim 8 further including a platform that is carried by said base so that said platform is generally parallel to said base and is disposed above said base and beneath said front blind.

14. The hunting blind of claim 8 wherein said base comprises a first skid and a second skid that are generally parallel to a longitudinal axis of said base.

15. A hunting blind comprising:
- a base that includes a support member that is carried by said base;
- a rear blind that is carried by said base and comprises a first rear side wall, a second rear side wall, a back wall and a top wall, wherein at least a portion of each of said first and said second rear side walls extends upwardly from said base, said back wall interconnects said first and said second rear side walls and said top wall is carried by one of said back wall, said first rear side wall and said second rear side wall;
- an interior space included in said rear blind and defined by said first rear side wall, said second rear side wall, said back wall and said top wall of said rear blind;
- a side shooting window defined by said top wall and one of said first rear side wall and said second rear side wall;
- a seat that is carried by said base, wherein at least a portion of said seat is disposed within said interior space of said rear blind;
- a front blind carried by said support member such that said front blind is vertically spaced above said base, said front blind comprising a front wall, a first front side wall and a second front side wall;
- said front wall being pivotally carried by said support member and said first front side wall and said second front side wall being interconnected by said front wall so that both of said first and said second front side walls extend perpendicularly from said front wall in a direction that is towards said rear blind;
- wherein said front blind may be placed in a collapsed position by rotating said front wall away from said rear blind and said front blind may be placed in an erect position by rotating said front wall of said front blind towards said rear blind; and,
- whereby when said front blind is in said erect position, said first and said second front side walls of said front blind are laterally spaced from said first and said second rear side walls of said rear blind to create an entry opening into said hunting blind and when said front blind is in said erect position, said front blind extends to a height that is lower than said side shooting window to create a front shooting window through which to shoot a gun.

16. The hunting blind of claim 15 wherein said top wall of said rear blind is carried by said back wall and one of said first rear side wall and said second rear side wall so that said top wall is in an angled relation to said rear wall, said first rear side wall and said second rear side wall so that a side of said top wall that is carried by said back wall is lower than an opposing side of said top wall.

17. The hunting blind of claim 15 further including a second support member that is carried by a rear portion and carries said seat and wherein said first support member is carried by a front portion of said base, wherein said first and said second support members extend from said base by the same height.

18. The hunting blind of claim 17 further comprising a platform that is carried by said first support member so that said platform is generally parallel to said base and is disposed above said base and beneath said front blind.

19. The hunting blind of claim 15 wherein said base comprises a first skid and a second skid that are parallel to one another, wherein each of said first and said second support members is carried by both of said first skid and said second skid.

20. The hunting blind of claim 15 wherein when said front blind is in said erect position, said front wall of said front blind has a height that is equal to the height of said side shooting window.

* * * * *